Feb. 17, 1959     J. B. HICKS     2,873,733
INTERNAL COMBUSTION ENGINES
Filed March 6, 1956
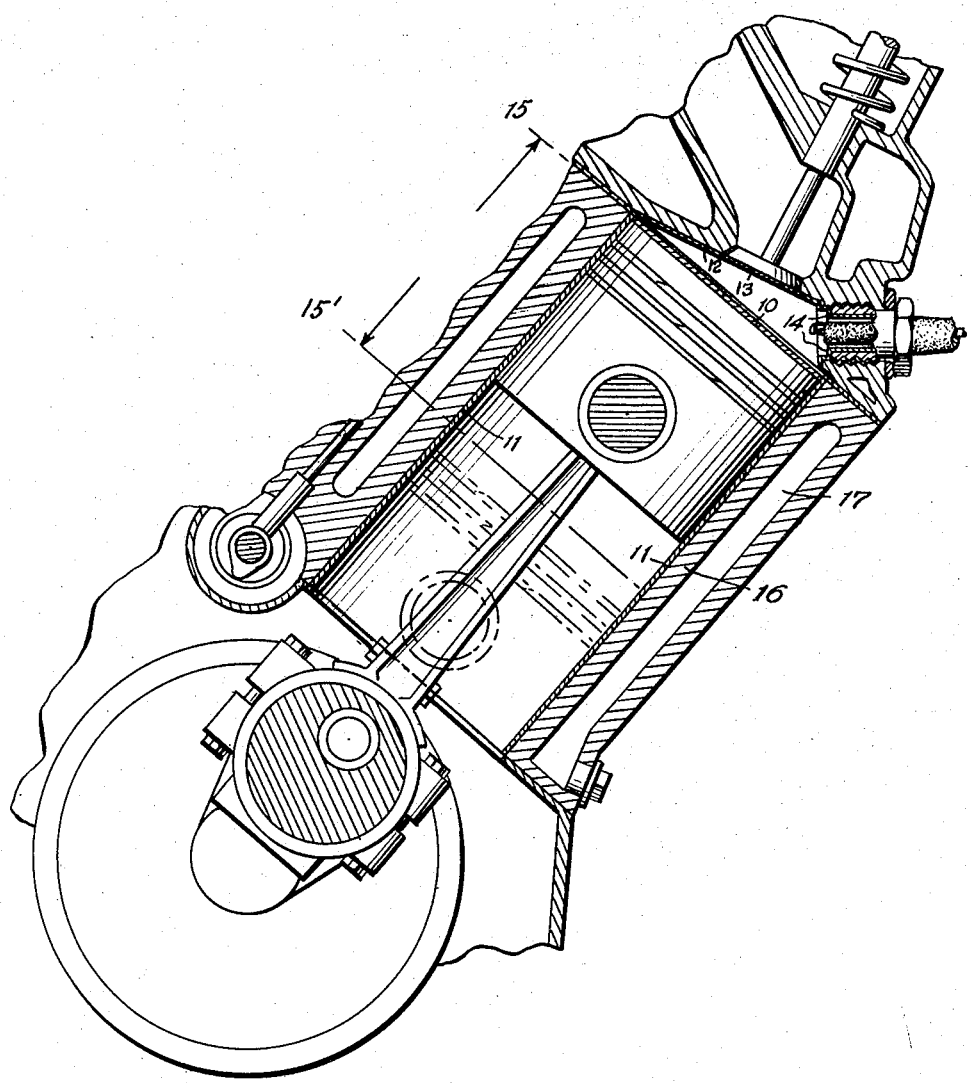
INVENTOR.
J. Byron Hicks

United States Patent Office 2,873,733
Patented Feb. 17, 1959

2,873,733

INTERNAL COMBUSTION ENGINES

Jarvis Byron Hicks, Euclid, Ohio

Application March 6, 1956, Serial No. 569,717

15 Claims. (Cl. 123—191)

This invention relates to new and useful improvements in internal combustion engines.

It is an object of this invention to improve the operating characteristics of internal combustion engines. It is a further object to improve the efficiency of internal combustion engines, as will hereinafter appear.

A considerable amount of the energy that is released by the combustion of the fuel in an internal combustion engine, is lost by radiation. This loss takes place through the walls of the combustion chamber, and other parts of the engine, and thereby, and by way of the water circulation system, to the atmosphere. As a result of heat losses the proportion of released energy converted into useful work is quite low, having been estimated as being on the order of fifteen percent. Whereas frictional losses contribute to this inefficiency, the amount of heat lost from the combustion chamber by radiation to the walls of the chamber, in the first instance, accounts for heat losses that may be as high as thirty percent or even higher.

In the past, some effort has been directed toward providing the interior surfaces of internal combustion engines with surfaces more or less reflective in character. However, prior steps in this direction have failed to achieve desired results, with respect to preventing heat losses, for reasons that will become clear in the course of this description.

In providing an effective reflecting surface, it is important that the means provided possess special properties having relation to the radiant energy generated in the combustion chamber during the process of combustion. Thus, in the combustion of mixtures of vaporized fuel and air such as are introduced into the combustion chamber, it is to be noted that a preponderant amount of the radiation is in the heat, or infra-red portion, of the spectrum. In this view, it is desirable to selectively provide surfaces that not only present a polished, mirror-like appearance, but that are composed of a metal that exhibits high heat reflective properties, as distinguished from one that is merely visibly reflective.

Further, however, the metal selected must possess additional properties, not all metals having high reflective properties in the infra-red, being adapted to purposes of my invention. For example, silver and copper are good reflectors of radiant energy in the infra-red or heat portion of the spectrum, but these are found to be poorly adapted to my purposes. A polished copper surface rapidly tarnishes and darkens under the conditions that prevail within the combustion chamber, and the reflective properties thereby are progressively destroyed. Likewise, silver quickly blackens when exposed to the corrosive conditions within the combustion chamber.

In addition, the area distribution of the reflecting surface is a matter of importance. I have found that the effect desired is selective with respect to the area involved, and this principle has enabled me to provide means for achieving the premised purposes in a manner surpassing prior results to a surprising degree, as will be understood from the following description. Other advantages in my invention will hereinafter appear.

Proceeding in accordance with my invention, I have found, that if the walls of the combustion chamber are supplied with surfaces in specified areas, composed of a metal that is refractory and resistant with respect to heat, corrosion, and mechanical distortion or damage, and that has a high reflectivity in the heat portion of the spectrum, heat losses may be effectively controlled and reduced, and the efficiency of the engine singularly improved.

I have found that the hereinafter described alloys possess properties that render them eminently suitable for my purposes. These alloys possess reflective properties that compare favorably with those of copper, but in addition these alloys are sufficiently resistant to corrosion as to be able to maintain the reradiation effect over extended periods of time, and further, these alloys are sufficiently hard and durable as to enable them to withstand the friction and other stresses to which they are subjected.

Alloys that I have found suitable to my purposes are those within the class generally designated as bronzes. In these alloys the predominant component is copper, tin being also present, but in lesser amount. For my purposes I find that those alloys known as white bronzes are preferable.

I desire to direct especial attention to those copper-tin alloys known as "speculum" metals. In these alloys the tin content may run as high as 45% or as low as 33%, a usual content being about 39%. The remainder of the alloy may be entirely of copper. However, in alloys of this class there may be present one or more additional elements, such as beryllium, cadmium, nickel, aluminum, cobalt and manganese. As a rule, the proportion of the latter elements will not exceed 2%.

When the aforesaid alloys are applied by electrodeposition, they exhibit a high lustre, and no further finishing may be necessary. However, if desired, buffing of the surfaces may be resorted to, for the purpose of further improving the surfaces. A method that will yield good results consists in first plating the surfaces of the combustion chamber with one of the aforesaid alloys, and thereafter, upon this base layer, superimposing an added layer of beryllium, finally subjecting the combined layers to treatment at elevated temperatures.

To avoid any possibility of confusion, I desire to point out that the term "speculum" is sometimes loosely used as pertaining to the finish surface on any and all metals that can be polished to mirror-like brightness. I do not so use the term. What I refer to is that particular class of alloys above set forth that corresponds to the term "speculum metal" or "speculum alloy."

The method of application of the metal surface to the combustion chamber is a matter of choice. Metal coatings can be applied to cylinders of internal combustion engines by methods of spraying, electroplating, or by other known means. The essential consideration is that the coating be firmly adherent, of bright reflective surface, and otherwise in correspondence with the criteria herein set forth.

While any of the surfaces of the combustion chamber, if treated in accordance with the principles of my invention, will exert a certain reflective action, whether the surface be the cylinder head, piston top, valve, or cylinder wall surfaces, it will be now understood that the larger the area covered the greater will be the effectiveness, and that for practical purposes a maximum area should be covered, best results generally being obtained by covering the entire available internal surface of the combustion chamber.

However, there are special reasons for fully coating certain of these areas, as I will now disclose. Not only is the wall of the cylinder an important portion of the combustion chamber, following the application of my invention, by reason of its considerable area, but further, since the cylinder walls are swept by the piston, the contribution of this swept portion to the reradiation of energy will be higher per unit area, than that of the unswept portions of the combustion chamber. This will follow from the better retention by the swept cylinder walls of that state of brightness that best provides reflective action.

My invention has special application to high compression ratio engines. In these the piston sweeps essentially the entire surface of the cylinder walls, whereas in low compression ratio engines, the length of the swept portion of the cylinder may be as little as two-thirds of the distance of the stroke. As will appear in the drawings herewith, it is advantageous that the reflecting surfaces extend well into and preferably entirely throughout the swept portion of the cylinder walls, and this may be accomplished by plating the entire cylinder, which thus serves both as a bearing surface and a reflecting surface.

In the accompanying drawing, there is shown a sectional view of an internal combustion engine, wherein there is incorporated an embodiment of my invention. In the drawing it will be observed that the surfaces of the combustion chamber are formed of a coating of metal hereinbefore described. The coating is distributed on the top of the piston 10, on the cylinder walls 11, on the cylinder head 12, on the valve surface 13, and on the exposed spark plug surfaces 14. The coating in this illustration covers the entire area, including that defining the combustion space for the full stroke of the piston 15—15', and down for the full length of the cylinder. Reference numeral 17 indicates the water jacket surrounding the cylinder, and numeral 16, the portion of the cylinder wall in contact therewith.

From the foregoing description and illustrations, further details within the scope of my invention will be apparent to those skilled in the art, or may be further developed. Having set forth the aforesaid examples by way of illustration and not of limitation, what I claim and desire to protect by Letters Patent is as follows:

1. An internal combustion engine having a combustion chamber the internal surfaces of which, exposed to radiant energy from the combustion of fuel within the combustion chamber, are composed of a metal that is more resistant than copper or aluminum to the action of heat, corrosion, and mechanical abrasion and stresses within the combustion chamber, and that has higher reflective properties in the infra-red or heat portion of the spectrum than iron, whereby radiant energy that is generated by said combustion and radiated outwardly to said internal surfaces is reflected and reradiated inwardly, and heat otherwise lost by radiation is conserved within the combustion chamber.

2. In an internal combustion engine having a combustion chamber the walls of which are exposed to radiant energy from the combustion of fuel within the combustion chamber, said radiant energy being absorbed in appreciable amounts by said walls, and being absorbed and passed by said walls to the cooling system and other parts of the engine in contact with the atmosphere, the improvement consisting in providing upon the inner surfaces of said walls a highly reflective surface composed of a metal having higher reflectivity in the infra-red or heat portion of the spectrum than iron, and further having resistance to heat, corrosion, and mechanical abrasion and stresses within said combustion chamber during operation of said engine higher than copper or aluminum, whereby a substantial portion of the radiant heat energy is reflected from said inner surfaces and is thereby reradiated back within said combustion chamber, and said energy is thereby conserved and the efficiency of the engine increased.

3. An internal combustion engine having a combustion chamber the internal surfaces of which, exposed to radiant energy from the combustion of fuel within the combustion chamber, are composed of a copper-tin alloy that is more resistant than copper or aluminum to the action of heat, corrosion, and mechanical abrasion and stresses within the combustion chamber, and that has higher reflective properties in the infra-red or heat portion of the spectrum than iron, whereby radiant energy that is generated by said combustion and radiated outwardly to said internal surfaces is reflected and reradiated inwardly, and heat otherwise lost by radiation is conserved within the combustion chamber.

4. An internal combustion engine having a combustion chamber the internal surfaces of which are composed of a copper-tin white bronze alloy that is more resistant than copper or aluminum to the action of heat, corrosion, and mechanical abrasion and stresses within the combustion chamber, and that has higher reflective properties in the infra-red or heat portion of the spectrum than iron.

5. An internal combustion engine having a combustion chamber the internal surfaces of which are composed of a copper-tin alloy comprising 33 percent to 45 percent tin, and copper, said alloy being more resistant than copper or aluminum to the action of heat, corrosion, and mechanical abrasion and stresses within the combustion chamber, and having higher reflective properties in the infra-red or heat portion of the spectrum than iron.

6. An internal combustion engine having a combustion chamber the internal surfaces of which are composed of an alloy comprising 33 percent to 45 percent tin, copper, and up to 2 percent of an element selected from the class consisting of beryllium, cadmium, nickel, aluminum, cobalt, manganese, and mixtures of said elements, said alloy being more resistant than copper or aluminum to the action of heat, corrosion, and mechanical abrasion and stresses within the combustion chamber, and having higher reflective properties in the infra-red or heat portion of the spectrum than iron.

7. An internal combustion engine having a combustion chamber the internal surfaces of which are composed of a copper-tin speculum alloy, said alloy being more resistant than copper or aluminum to the action of heat, corrosion, and mechanical abrasion and stresses within the combustion chamber, and having higher reflective properties in the infra-red or heat portion of the spectrum than iron.

8. In an internal combustion engine the improvement comprising providing upon the inner surfaces of the combustion chamber walls a surface composed of a copper-tin alloy that is more resistant than copper or aluminum to the action of heat, corrosion, and mechanical abrasion and stresses within the combustion chamber, and that has higher reflective properties in the infra-red or heat portion of the spectrum than iron, whereby radiant energy that is generated by combustion and radiated outwardly to said inner surfaces is reflected and reradiated inwardly, and heat otherwise lost by radiation is conserved within the combustion chamber.

9. In an internal combustion engine the improvement comprising providing upon the inner surfaces of the combustion chamber walls a surface composed of a copper-tin white bronze alloy that is more resistant than copper or aluminum to the action of heat, corrosion, and mechanical abrasion and stresses within the combustion chamber, and that has higher reflective properties in the infra-red or heat portion of the spectrum than iron.

10. In an internal combustion engine the improvement comprising providing upon the inner surfaces of the combustion chamber walls a surface composed of a copper-tin alloy comprising 33 percent to 45 percent tin, and copper, said alloy being more resistant than copper or aluminum to the action of heat, corrosion, and mechanical abrasion and stresses within the combustion chamber, and having higher reflective properties in the infrared or heat portion of the spectrum than iron.

11. In an internal combustion engine the improvement comprising providing upon the inner surfaces of the combustion chamber walls a surface composed of an alloy comprising 33 percent to 45 percent tin, copper, and up to 2 percent of an element selected from the class consisting of beryllium, cadmium, nickel, aluminum, cobalt, manganese, and mixtures of said elements, said alloy being more resistant than copper or aluminum to the action of heat, corrosion, and mechanical abrasion and stresses within the combustion chamber, and having higher reflective properties in the infra-red or heat portion of the spectrum than iron.

12. In an internal combustion engine the improvement comprising providing upon the inner surfaces of the combustion chamber walls a surface composed of a copper-tin speculum alloy, said alloy being more resistant than copper or aluminum to the action of heat, corrosion, and mechanical abrasion and stresses within the combustion chamber, and having higher reflective properties in the infra-red or heat portion of the spectrum than iron.

13. An internal combustion engine having a combustion chamber wherein the internal surfaces of the walls of the cylinder and the other internal surfaces of the combustion chamber are composed of a metal alloy that is more resistant than copper or aluminum to the action of heat, corrosion, and mechanical abrasion and stresses within the combustion chamber, and that has higher reflective properties in the infra-red or heat portion of the spectrum than iron, whereby heat otherwise lost by radiation is conserved within the combustion chamber.

14. In an internal combustion engine having a combustion chamber the improvement comprising providing upon the internal surfaces of the walls of the cylinder and other internal surfaces of the combustion chamber a surface composed of a metal alloy that is more resistant than copper or aluminum to the action of heat, corrosion, and mechanical abrasion and stresses within the combustion chamber, and that has higher reflective properties in the infra-red or heat portion of the spectrum than iron, whereby heat otherwise lost by radiation is conserved within the combustion chamber.

15. In an internal combustion engine having a combustion chamber the inner surfaces of which are exposed to radiant energy from the combustion of fuel within the combustion chamber, said radiant energy being absorbed in appreciable amounts by said combustion chamber, and from said combustion chamber passed to the cooling system and other parts of the engine in contact with the atmosphere, the improvement consisting in providing upon the entire inner surfaces of said combustion chamber a highly reflective surface composed of a metal having higher reflectivity in the infra-red or heat portion of the spectrum than iron and further having resistance to heat, corrosion, and mechanical abrasion and stresses within said combustion chamber during operation of said engine higher than copper or aluminum, whereby a substantial portion of the radiant heat energy is reflected from said inner surfaces and is thereby conserved and the efficiency of the engine increased.

References Cited in the file of this patent

UNITED STATES PATENTS

| | | |
|---|---|---|
| 1,755,578 | Goldsborough | Apr. 22, 1930 |
| 1,857,077 | Adamson | May 3, 1932 |
| 1,869,077 | Prentice | July 26, 1932 |
| 2,075,388 | De Cloud | Mar. 30, 1937 |
| 2,106,914 | O'Orange | Feb. 1, 1938 |
| 2,113,629 | Rabezzana | Apr. 12, 1938 |
| 2,127,758 | Schmitz | Aug. 23, 1938 |